United States Patent [19]
Payne

[11] Patent Number: 5,596,811
[45] Date of Patent: Jan. 28, 1997

[54] CHAINSAW GUIDE BAR

[75] Inventor: Robert C. Payne, Jackson, Tenn.

[73] Assignee: Sandvik AB, Sandviken, Sweden

[21] Appl. No.: 428,736

[22] Filed: Apr. 25, 1995

[51] Int. Cl.$^6$ .................................................. B27B 17/02
[52] U.S. Cl. .................................................. 30/383; 30/387
[58] Field of Search ........................... 30/383, 387, 382, 30/381

[56] References Cited

U.S. PATENT DOCUMENTS

| | | |
|---|---|---|
| 1,397,026 | 11/1921 | Wolf . |
| 1,526,451 | 2/1925 | Wolf . |
| 2,774,395 | 12/1956 | Tweedie . |
| 2,897,856 | 8/1959 | Carlton . |
| 2,948,309 | 8/1960 | Hoff et al. . |
| 2,962,812 | 12/1960 | Gommel . |
| 3,102,562 | 9/1963 | Horncastle . |
| 3,119,418 | 1/1964 | Rayniak et al. . |
| 3,185,191 | 5/1965 | Olsen . |
| 3,241,228 | 3/1966 | Rayniak et al. . |
| 3,377,214 | 4/1968 | Woodbridge et al. . |
| 3,416,578 | 12/1968 | Irgens . |
| 3,473,581 | 10/1969 | Merz . |
| 3,542,094 | 11/1970 | Gibson et al. . |
| 3,726,326 | 4/1973 | Coleman . |
| 3,744,363 | 7/1973 | Espana et al. . |
| 3,760,141 | 9/1973 | Espana et al. . |
| 3,840,991 | 10/1974 | Arff et al. .................... 30/383 |
| 3,858,321 | 1/1975 | Contay . |
| 3,987,543 | 10/1976 | Rätz et al. . |
| 3,991,799 | 11/1976 | Albright . |
| 4,138,813 | 2/1979 | Harada et al. . |
| 4,415,378 | 11/1983 | McKinney et al. . |
| 4,641,432 | 2/1987 | Kume . |
| 4,693,007 | 9/1987 | Apfel et al. . |
| 4,722,141 | 2/1988 | Lim et al. . |
| 4,768,289 | 9/1988 | Apfel et al. . |
| 4,874,437 | 10/1989 | Masuda et al. . |
| 4,958,670 | 9/1990 | Johnson . |
| 4,965,934 | 10/1990 | Eriksson et al. ............ 30/383 X |
| 5,052,109 | 10/1991 | Vanderzanden et al. .... 30/383 X |
| 5,093,998 | 3/1992 | Seigneur et al. . |
| 5,144,867 | 9/1992 | Yajima et al. . |

FOREIGN PATENT DOCUMENTS

93/08968  5/1993  WIPO .

OTHER PUBLICATIONS

Pp. 564–565 and 588 from Deposition Testimony of Robert C. Payne, vol. 6, Jul. 27, 1995, in Blount, Inc. v. Sandvik Windsor Corp., Case No. CV 95–272, United States District Court for the District of Columbia (Proprietary—Submitted Under Seal).

*Primary Examiner*—Hwei-Siu Payer
*Attorney, Agent, or Firm*—Burns, Doane, Swecker & Mathis, L.L.P.

[57] ABSTRACT

Guide bar for saw chain, where the chain is supported by a nose sprocket while traversing the front end. Regions of the edges of the guide bar are locally hardened to a higher hardness than the rest of the guide bar. The regions of hardness are where the chain impacts the bar near an attachment end of the guide bar after having left the drive sprocket of the power socket, and where the chain settles on the guide bar edge after having been supported by the nose sprocket while traversing the nose curvature, where a cutting action occurs on the bar, but omitted in an area delineated from a point adjacent the oil holes at the attachment end to a point before where a majority of the cutting action occurs.

20 Claims, 1 Drawing Sheet

CHAINSAW GUIDE BAR

BACKGROUND AND SUMMARY OF THE PRESENT INVENTION

Chainsaws are traditionally made with guide bars, where the saw chain runs with the drivelink tangs in a groove along the perimeter of the guide bar and is carried at the front end of the guide bar by a toothed sprocket inserted in the guide bar. The guide bars are either solid, i.e., made from a single steel plate with a milled or ground groove, or laminated, i.e., made from three thinner plates joined by spot welding, with the groove being created by the middle plate being smaller than the side plates. The guide bars are usually hardened along the edges to improve the wear resistance where the chain slides along the guide bar, and unhardened or have a lower hardness between the edges.

It has been shown, however, that guide bars of the known types when used in vehicle-born and stationary tree harvester machines are easily damaged if, for example, the grip of the machine around the tree trunk is not firm enough. If the grip is not firm enough, the tree can slide downward onto the chain saw bar, thus causing a considerable bending force to be imparted. A common type of damage is when the guide bar is bent near the end attached to the machine where the bending moment is at a maximum. It is often difficult to straighten conventional guide bars without creating cracks in the hardened edge and fractures near the spot welds (in laminated guide bars), where hard brittle regions border on soft heat affected zones.

U.S. Pat. No. 5,052,109 discloses that soft annealing of a narrow zone across the width of the guide bar near the end attached to the machine will concentrate any bending to this bending zone, where the hardness both at the weld spots and at the previously hardened edges is low enough to avoid fracture to a degree, and that such a guide bar is easier to straighten after it has been bent. Also, U.S. Pat. No. 5,052,109 teaches spacing the narrow soft annealed zone to be adjacent to the mounting bracket. An apparent result of positioning of the soft annealed bending zone to be spaced in front of the mounting bracket is that the part of the bar covered by the mounting bracket is subjected to lower transverse forces, thereby reducing chances of damage thereto. Disadvantages with this method are that the force a guide bar can withstand without bending is lower, and that the edges may become wrinkled during the concentrated bending and it may be difficult to get the edges smooth when an attempt is made to restraighten the bar. In other words, to make it easier to straighten, the bar is made easier to bend. This has the result of the bar being bent more readily, which requires the bar to be removed from the harvester and restraightened more often. The restraightening process is labor intensive and results in considerable down time for the mechanical harvester. Also, because a restraightened bar has a considerably shorter life than a bar not restraightened (due to tempering inherent to the restraightening operation and the difficulty in getting the edge rails smooth), the net result of softening a zone in guide bars in accordance with the U.S. Pat. No. 5,052,109 is a relatively short guide bar life.

A solution to the problems associated with guide bars bending is proposed in co-pending U.S. patent application No. 08/239,316 filed on May 6, 1994, now U.S. Pat. No. 5,561,908 in the name of Arvo Leini. This solution involves making the bar more resistant to bending by providing a relatively hard body. The relatively hard body provides a spring-like action to bending forces. For instance, when subjected to a transverse force due to a tree slipping in a mechanical harvester gripper, the bar will deflect a considerable degree, and, when the force is removed, the bar will usually spring back to its original shape. The advantages are clear. Since the bar is not bent, it does not need to be removed from the harvester for restraightening. The bar's deflection, however, might otherwise result in the hardened edge rails cracking at the point of deflection even when the bar springs back to its original shape. The Leini invention includes the feature of interrupting the edge hardening of the guide bar rails in front of the mounting bracket to avoid this possibility. The bending is, however, never limited to the area outside of the mounting bracket. Due to the strain in the clamping bolts when the bar is deflected, the mounting bracket will open a small amount, and part of the bar within the mounting bracket will also be deflected as far back as the clamping bolts. This part of the bar is especially vulnerable due to small oil holes in proximity of the edges, acting to raise the local stress above that created in a part of the bar without holes. It is previously known to omit edge hardening adjacent to the oil holes of guidebars for hand-held chainsaws, but such guidebars differ from bars for harvesters mainly in size, hand-held chainsaws having bar thickness around 4 mm, harvesters bars having a bar thickness around 5–6 mm. Omitting the hardening adjacent to the oil holes also reduces the risk of cracking during manufacture, in the event thast the hardening depth is incorrectly adjusted, or in event that the oil holes are moved to be more closely adjacent to the edges and/or a thinner bar are used.

The present invention concerns a guide bar where the risk of cracks at the edges due to bending of the bar and due to the proximity of the oil holes to the edge rails is reduced or eliminated without lowering of the bending resistance, and where any bending will not be so concentrated that the edges could get wrinkled.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION OF THE PREFERRED EMBODIMENT

Figure 1:
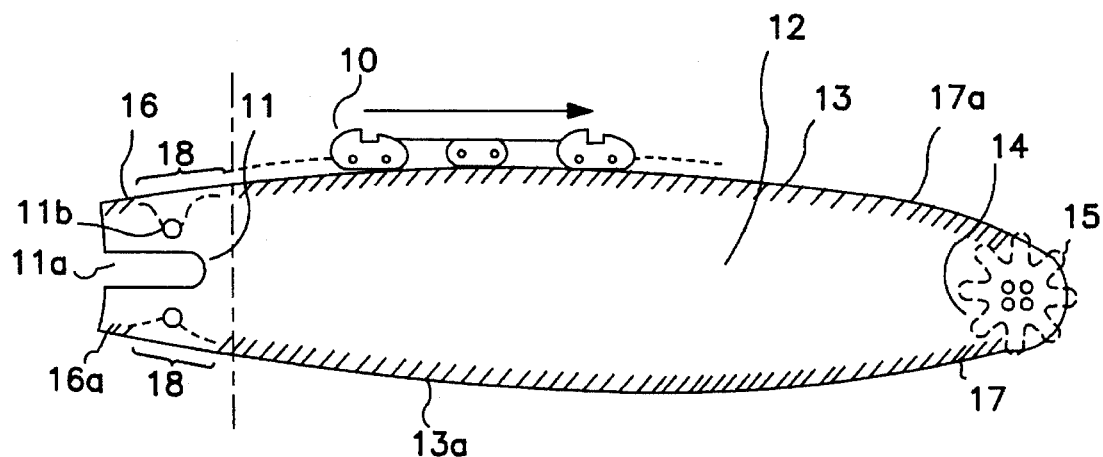
FIG. 1 is a side view of a guide bar according to an embodiment of the present invention.

The guide bar senn in FIG. 1 includes an attachment end (11) with a slot (11a) for receiving fastening bolts. The mounting structure can vary according to the model of chain saw to which the bar is attached. For instance, the slot (11a) may be a combination of a slot and spaced holes for receiving bolts. Also, the slot (11a) may be open ended as shown or closed at both ends. The end of the slot (11a) generally demarcates the minimum area covered by a mounting bracket illustrated by the chainlink line in the accompanying figure.

The attachment end (11) also includes holes (11b) for oil supply, the oil being supplied through the mounting structure into channels (shown in phantom along with a portion of the groove in the accompanying figure) within the guide bar to feed oil to one or more locations along the guide rail. In laminated bars, the oil channels can extend a majority of the length of the bar. During the manufacturing process and during deflection of the guide bar, depending on the location of the holes relative to the edge rail and the relative thickness to the bar and relative thickness of rail hardening, these holes (11b) can cause cracks to form in the edge rails, particularly if the guide bar is made relatively thin to allow for greater cutting speed.

The bar includes a central part or body (12) with very slightly curved edges (13), an attachment end (11), a front end (14) and a toothed sprocket (15) inserted with its bearing into the front end (14).

Wear on the edges of the guide bar is concentrated in those regions where the saw chain (10) impacts the edges after traveling a shorter or longer path without support from the edges. In these regions, high peak forces occur and lubrication cannot easily be arranged there. Such regions are where the chain part coming from the drive sprocket (not shown) first impacts the guide bar edge (16) at the attachment end (11), and where the saw chain, after having traversed the front end (14) while elevated and supported by the sprocket (15), settles again on the edge (17) at the front end. Within these limited regions (16, 17) the edge needs to be considerably harder than the central part (12) in order to limit wear.

With vehicle born tree harvesters, there is the perception that the guide bar is subjected to wear on the slightly curved edges (13) of the central part (12) where the cutting action occurs, i.e., where the chain meets the tree, and therefore the slightly curved edges (13) are provided with a specified hardness. This hardness can be less than that of the limited regions (16,17), but for ease of manufacturing the hardness can be maintained the same over the slightly curved edges (13) and the limited regions (16,17).

The hardening of the edges extends only a small predetermined extent into the body from the edge of the guide bar because the relatively high hardness makes the bar more brittle and therefore less tolerant of bending forces. To make the guide bar reversible, the edge should preferably be made with the higher hardness also in the symmetrically located regions (13a, 16a, 17a).

At the front end (14), and at the rear part of the attachment end behind the clamping bolts and oil holes (16) the bending moment is small since any forces are at a short distance, and at the attachment end (11) bending is restricted since it is clamped between rigid blocks. Thus the edge in the regions (16, 17) can be harder and more wear resistant than the rest of the edge without the risk of edge cracking. Also, because most of the bending moment will be concentrated immediately adjacent the front end of the mounting bracket, a majority of edge rails (13) in the central part (12) can be edge hardened.

To accommodate the spring-like action of the hardened body when subjected to transverse forces and the appearance of the oil holes (11b) in the attachment end (11), the inventive guide bar includes an interruption in the rail hardening in a region (18) extending from a point behind the oil holes (11b) to a point in front of the mounting bracket. The edge hardening, for example, is present at the limited area (16) at the attachment end (11), along the central portion (13) and adjacent the front sprocket (15). The edge hardening is interrupted in a region (18) bounded by a first point adjacent to the oil holes (11b) closer to the terminus of the attachment end (11) to a second point in front of the mounting area. The second point is located between the mounting area and where a majority of the cutting action occurs on the central edge portion (13), e.g., about a third of the way along the guide bar. This interruption in edge hardening therefore extends, in one preferred embodiment, about one fourth the length of the guide bar or greater.

In certain instances, using the present invention, the mounting structure (not shown) will be subjected to greater transverse forces relative to the comparatively easily bent guide bar of U.S. Pat. No. 5,052,109. Rather than go in the direction suggested by the hinge zone disclosed in that patent, the present inventor interrupts the rail hardening from a point in front of the mounting structure to a point under the mounting bracket and adjacent to the oil holes, viewing the advantages thereof as greatly outweighing any perceived advantages of the prior art.

When no cracks are initiated at the edge, the rest of the guide bar can be made harder than usual, lowering the risk of concentrated bending and edge wrinkling considerably. Suitable hardness values for the regions with highest hardness (13,16,17) are 58–64 and for the rest of the guide bar 44–53 according to the Rockwell C scale (HRC). Traditional hardness values for guide bars, where the whole length of the edges are hardened, is 59–61 HRC for the edges and 42–47 HRC for other parts of the guide bar.

Figure 2:
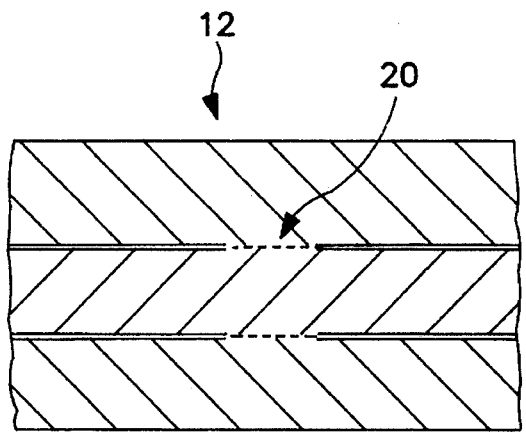
FIG. 2 is a cross-sectional view of a guide bar according to an embodiment of the present invention showing a spot-welded portion of the guide bar.

Before regional edge hardening, the entire guide bar is preferably hardened and tempered to the hardness 44–53 HRC. For laminated bars this is done after spot welding, thus eliminating any heat affected zones near the weld spots 20, such as are shown in FIG. 2. Alternatively, the guide bar can be made from two pre-hardened side plates and a boron alloy middle plate as disclosed in U.S. Pat. No. 4,965,934.

The edge hardening of the hard regions (16, 17) can be done with a gas flame or with inductive heating in known ways.

The principles, preferred embodiment, and mode of operation of the present invention has been described in the foregoing specification. However, the invention is not intended to be limited to the disclosed embodiment but encompasses variations and changes that fall within the appended claims.

What is claimed is:

1. A guide bar for saw chain, comprising:

a guide bar body, the guide bar body including longitudinal edges having one or more grooves for guiding drive links of a saw chain, an attachment end having a configuration for mounting the guide bar to a chain power drive and at least one oil hole for receiving lubricating oil for distribution in the groove, and a nose sprocket end for receiving a nose sprocket; and a nose sprocket for supporting the saw chain while it traverses a front end of the guide bar, the nose sprocket being inserted in the guide bar body at the nose sprocket end, wherein the longitudinal edges of the guide bar have regions locally hardened to a higher hardness than the rest of the guide bar, the guide bar including one or more of the locally hardened regions extending a limited distance from the nose sprocket end toward the attachment end, and one or more of the locally hardened regions extending a limited distance from the attachment end toward the nose sprocket end, and one or more regions which are not locally hardened extending from a point no farther toward the nose sprocket end from the attachment end than adjacent to oil holes in the attachment end to a point located forward, in a direction from the attachment end toward the nose sprocket end, of where outer edges of a mounting assembly of a chain power drive are disposed when the guide bar is mounted to the chain power drive.

2. A guide bar according to claim 1, wherein the locally hardened regions extend for at least one fourth of the length of the guide bar.

3. A guide bar according to claim 1, wherein the locally hardened regions have a hardness of 58–64 on the Rockwell C scale and the other regions have a harness of 44–53 on the Rockwell C scale.

4. A guide bar according to claim 1, wherein the entire guide bar is hardened and the locally hardened regions are subsequently further hardened.

5. A guide bar according to claim 1, wherein the guide bar includes one or more components having one or more spot welds therein, the guide bar being uniformly hardened and tempered after spot welding so that heat affected zones near the spot welds are eliminated, and thereafter locally hardened to provide the locally hardened regions.

6. The guide bar according to claim 1, wherein the guide bar is a laminated guide bar.

7. The guide bar according to claim 1, wherein the guide bar is a solid guide bar.

8. The guide bar according to claim 1, wherein the locally hardened regions have a hardness of 58–64 on the Rockwell C scale.

9. The guide bar according to claim 1, wherein all portions of the guide bar outside of the locally hardened regions have a hardness of 44–53 on the Rockwell C scale.

10. The guide bar according to claim 1, wherein the point located forward of where outer edges of the mounting assembly of the chain power drive are disposed when the guide bar is mounted to the chain power drive is located rearward, from the nose sprocket end toward the attachment end, from a location along the longitudinal edges of the bar where a majority of the cutting action occurs.

11. The guide bar according to claim 10, wherein the locally hardened regions extending a limited distance from the nose sprocket end toward the attachment end extend to the point located forward of where outer edges of the mounting assembly of the chain power drive are disposed when the guide bar is mounted to the chain power drive.

12. The guide bar according to claim 1, wherein the guide bar is symmetrical about a longitudinal axis, and locally hardened regions are disposed symmetrically on opposite sides of the longitudinal axis.

13. A guide bar for saw chain, comprising:

a guide bar body, the guide bar body including longitudinal edges having one or more grooves therein for guiding drive links of a saw chain, an attachment end having a configuration for mounting the guide bar to a chain power drive and at least one oil hole for receiving lubricating oil for distribution in the groove, and a nose end opposite the attachment end, wherein the longitudinal edges of the guide bar have regions locally hardened to a higher hardness than the rest of the guide bar, the guide bar including one or more of the locally hardened regions extending a limited distance from the nose end toward the attachment end, and one or more of the locally hardened regions extending a limited distance from the attachment end toward the nose end, and one or more regions which are not locally hardened extending from a point no farther toward the nose end from the attachment end than adjacent to oil holes in the attachment end to a point located forward, in a direction from the attachment end toward the nose end, of where outer edges of a mounting assembly of a chain power drive are disposed when the guide bar is mounted to the chain power drive.

14. A guide bar according to claim 13, wherein the locally hardened regions extend for at least one fourth of the length of the guide bar.

15. A guide bar according to claim 13, wherein the entire guide bar is hardened and the locally hardened regions are subsequently further hardened.

16. A guide bar according to claim 13, wherein the guide bar includes one or more components having one or more spot welds therein, the guide bar being uniformly hardened and tempered after spot welding so that heat affected zones near the spot welds are eliminated, and thereafter locally hardened to provide the locally hardened regions.

17. The guide bar according to claim 13, wherein the locally hardened regions have a hardness of 58–64 on the Rockwell C scale.

18. The guide bar according to claim 13, wherein all portions of the guide bar outside of the locally hardened regions have a hardness of 44–53 on the Rockwell C scale.

19. The guide bar according to claim 13, wherein the point located forward of where outer edges of the mounting assembly of the chain power drive are disposed when the guide bar is mounted to the chain power drive is located rearward, from the nose end toward the attachment end, from a location along the longitudinal edges of the bar where a majority of the cutting action occurs.

20. The guide bar according to claim 19, wherein the locally hardened regions extending a limited distance from the nose end toward the attachment end extend to the point located forward of where outer edges of the mounting assembly of the chain power drive are disposed when the guide bar is mounted to the chain power drive.

* * * * *